United States Patent [19]
Yamaguchi et al.

[11] Patent Number: 5,193,885
[45] Date of Patent: Mar. 16, 1993

[54] HYDRAULIC PRESSURE BOOSTER SYSTEM

[75] Inventors: Seiji Yamaguchi; Hiroshi Yoshida, both of Higashimatsuyama, Japan

[73] Assignee: Jidosha Kiki Co., Ltd., Tokyo, Japan

[21] Appl. No.: 691,298

[22] Filed: Apr. 25, 1991

[30] Foreign Application Priority Data

May 1, 1990 [JP] Japan .................. 2-46706[U]
Jun. 21, 1990 [JP] Japan .................. 2-65742[U]

[51] Int. Cl.$^5$ ............................................. B60T 13/14
[52] U.S. Cl. ....................................... 303/87; 303/10;
138/26; 138/118; 180/305; 180/306
[58] Field of Search ............. 192/109 F; 180/242,
180/302, 305, 306; 303/84.1, 87, 10, 11, 114 R,
114 PB, DIG. 5; 138/26, 30, 118; 417/540

[56] References Cited

U.S. PATENT DOCUMENTS

| | | | |
|---|---|---|---|
| 2,593,316 | 4/1952 | Kraft | 417/540 |
| 3,323,305 | 6/1967 | Klees | 138/26 X |
| 4,301,908 | 11/1981 | Fukuda et al. | 192/109 F |
| 4,801,245 | 1/1989 | de Haas et al. | 417/540 X |
| 4,924,992 | 5/1990 | Romig | 192/109 F X |
| 4,952,002 | 8/1990 | Arikawa et al. | 303/DIG. 5 |

FOREIGN PATENT DOCUMENTS

| | | | |
|---|---|---|---|
| 2609905 | 9/1977 | Fed. Rep. of Germany | 303/114 R |
| 3248651 | 7/1984 | Fed. Rep. of Germany | 303/87 |
| 3636442 | 5/1988 | Fed. Rep. of Germany | 303/114 R |

*Primary Examiner*—Douglas C. Butler
*Assistant Examiner*—Alfred Muratori
*Attorney, Agent, or Firm*—Varndell Legal Group

[57] ABSTRACT

The present invention is directed to providing an accumulator for pulsation absorption on a feeding passage between a hydraulic pressure generating device and hydraulic pressure booster equipment, and to provide a restriction on a section of the feeding passage between the accumulator and the hydraulic pressure generating device. As the result, the pulsation caused by a pump is reduced by the restriction, and the pulsation thus reduced is absorbed by the accumulator. Therefore, pulsation is effectively decreased by the restriction and the accumulator, and the pulsation transmitted to the hydraulic pressure booster equipment is quite small.

4 Claims, 2 Drawing Sheets

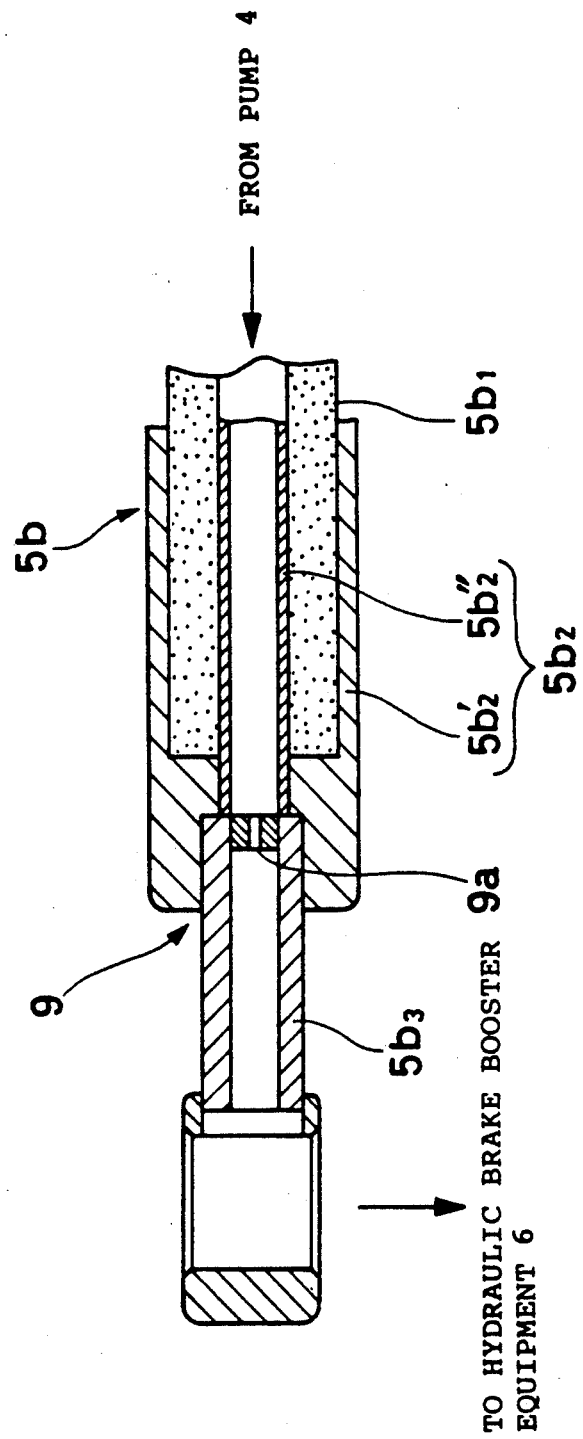

5,193,885

HYDRAULIC PRESSURE BOOSTER SYSTEM

BACKGROUND OF THE INVENTION

The present invention relates to a hydraulic pressure booster system, in which a hydraulic pressure booster equipment such as brake booster boosts the input to the predetermined value and outputs it by the pressurized operating fluid from hydraulic pressure generating means.

The hydraulic pressure booster system is used in various equipment and devices such as brake booster system in brake unit of automobile or clutch booster system in power transmission equipment, and it provides big operating force by small actuating force.

In the hydraulic pressure booster system of conventional type, hydraulic pressure generating means is provided for generating hydraulic pressure because hydraulic pressure is utilized, and a pump consisting of piston pump is normally used as such hydraulic pressure generating means.

However, in case such piston pump is used, pulsation occurs in the hydraulic pressure circuit by reciprocal movement of the piston, and this pulsation is transmitted to the hydraulic pressure booster equipment through the hydraulic pressure circuit. For this reason, the noise caused by pump pulsation is generated in the vehicle through the hydraulic pressure booster equipment. Also, because of such pump pulsation, stable operation of the hydraulic pressure booster equipment is hindered.

To solve the problem, it is proposed that an accumulator to absorb this pulsation is provided on the supply passage to feed the operating fluid. By such accumulator, pump pulsation can be absorbed to some extent.

However, it is difficult by this accumulator for absorbing pulsation in some cases to absorb the pulsation efficiently and adequately, and the transmission of the pulsation to the hydraulic pressure booster equipment cannot be prevented completely.

Even in such case, it is desirable that pulsation can be absorbed as much as possible. To cope with such demand, study has been performed in various ways, and it has been found that, if long flexible hose is furnished before and after the accumulator, the pulsation can be efficiently absorbed even when it is difficult to absorb the pulsation by accumulator only. In such case, in order to perfectly obtain the pulsation absorbing effect by flexible hose, it is necessary to sufficiently extend the length of the hose.

Incidentally, the hydraulic pressure booster equipment such as hydraulic brake booster or hydraulic clutch booster equipment must be designed in compact form to suit the place or the space where it is furnished. Therefore, the length of the flexible hose as described above must also be limited to such length as to match the layout of the system.

Thus, the demands must be fulfilled, on the one hand to extend the length of the hose as long as possible in order to obtain the better pulsation absorbing effect, and on the other hand, to shorten the length of the hose to meet the requirements limited by the layout of the system.

SUMMARY OF THE INVENTION

The object of the present invention is to offer a hydraulic pressure booster system, by which the pulsation caused by pump can be more effectively absorbed.

It is another object of this invention to offer a hydraulic pressure booster system, which can be designed in compact form.

To attain such objects, the present invention offers a hydraulic pressure booster system for boosting the inputs to the desired value and outputs it by feeding the pressurized operating fluid to hydraulic pressure booster equipment through the feeding passage from the hydraulic pressure generating means during operation, and it is characterized in that an accumulator for absorbing pulsation is furnished in said feeding passage and that an orifice is provided on a section of said feeding passage between said accumulator and said hydraulic pressure generating means.

Also, the hydraulic pressure booster system according to the present invention is characterized in that at least a part of said feeding passage section is formed by a flexible hose, and that said orifice is provided on the hose closer to the accumulator for absorbing pulsation.

Further, the hydraulic pressure booster system according to the present invention is characterized in that an accumulator for absorbing pulsation is provided on said feeding passage, that at least a part of the section of said feeding passage between said accumulator and said hydraulic pressure generating means and at least a part of the section of said feeding passage between said accumulator and said hydraulic pressure booster equipment is formed each by a flexible hose, that the length of said flexible hose closer to said hydraulic pressure booster equipment is longer than the length of said flexible hose on said hydraulic pressure generating means, and further that an orifice is provided on the section of said accumulator side of the flexible hose on said hydraulic pressure generating means or on the section of said feeding passage between the flexible hose closer to said hydraulic pressure generating means and said accumulator.

In the hydraulic pressure booster system according to the present invention with such arrangement, an accumulator for absorbing pulsation is provided on the feeding passage and an orifice is provided on the section of said feeding passage between said accumulator and said hydraulic pressure generating means. Accordingly, the pulsation by the pump is reduced by the orifice, and the pulsation thus reduced is absorbed by the accumulator for absorbing pulsation. Therefore, the pulsation is effectively reduced by the orifice and the accumulator, and almost no pulsation is transmitted to the hydraulic pressure booster equipment.

Also, because at least a part of the section of the feeding passage is formed by flexible hose and an orifice is provided on the accumulator for absorbing pulsation of this hose, the pulsation is reduced by the orifice and the accumulator and it is further reduced by the elasticity of the flexible hose. As the result, the pulsation is more effectively reduced.

Further, in the hydraulic pressure booster system according to the present invention, the pulsation generated by the pump is absorbed by the flexible hose and the orifice on the side of hydraulic pressure generating means. In this case, the pulsation absorption by this flexible hose is low because the flexible hose on the side of hydraulic pressure generating means is formed relatively short, whereas the pulsation absorption by the orifice is big.

Next, the pulsation is absorbed by the accumulator for absorbing pulsation, and finally by the flexible hose on the side of the hydraulic pressure booster equipment. Because the flexible hose on the side of hydraulic pressure booster equipment is formed relatively long, the pulsation absorption by this flexible hose is big.

Thus, in the pulsation absorption by the relatively short flexible hose and orifice on the side of hydraulic pressure generating means and by relatively long flexible hose on the side of hydraulic pressure booster equipment, the same effect can be obtained as the pulsation absorption by two flexible hose when these flexible hoses are sufficiently elongated, and it is possible to more efficiently absorb the pulsation.

In so doing, the transmission of the noise due to pulsation to inside the vehicle can be prevented, and the pulsation is not transmitted to the hydraulic pressure booster equipment almost at all.

Also, because the flexible hose on the side of hydraulic pressure generating means is formed relatively short, the entire system is formed in compact design, and adequate action can be taken to meet the restriction in terms of the system layout.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 2 is a cross-sectional view of an orifice to be used in the embodiment.

DESCRIPTION OF THE PREFERRED EMBODIMENT

Figure 1:
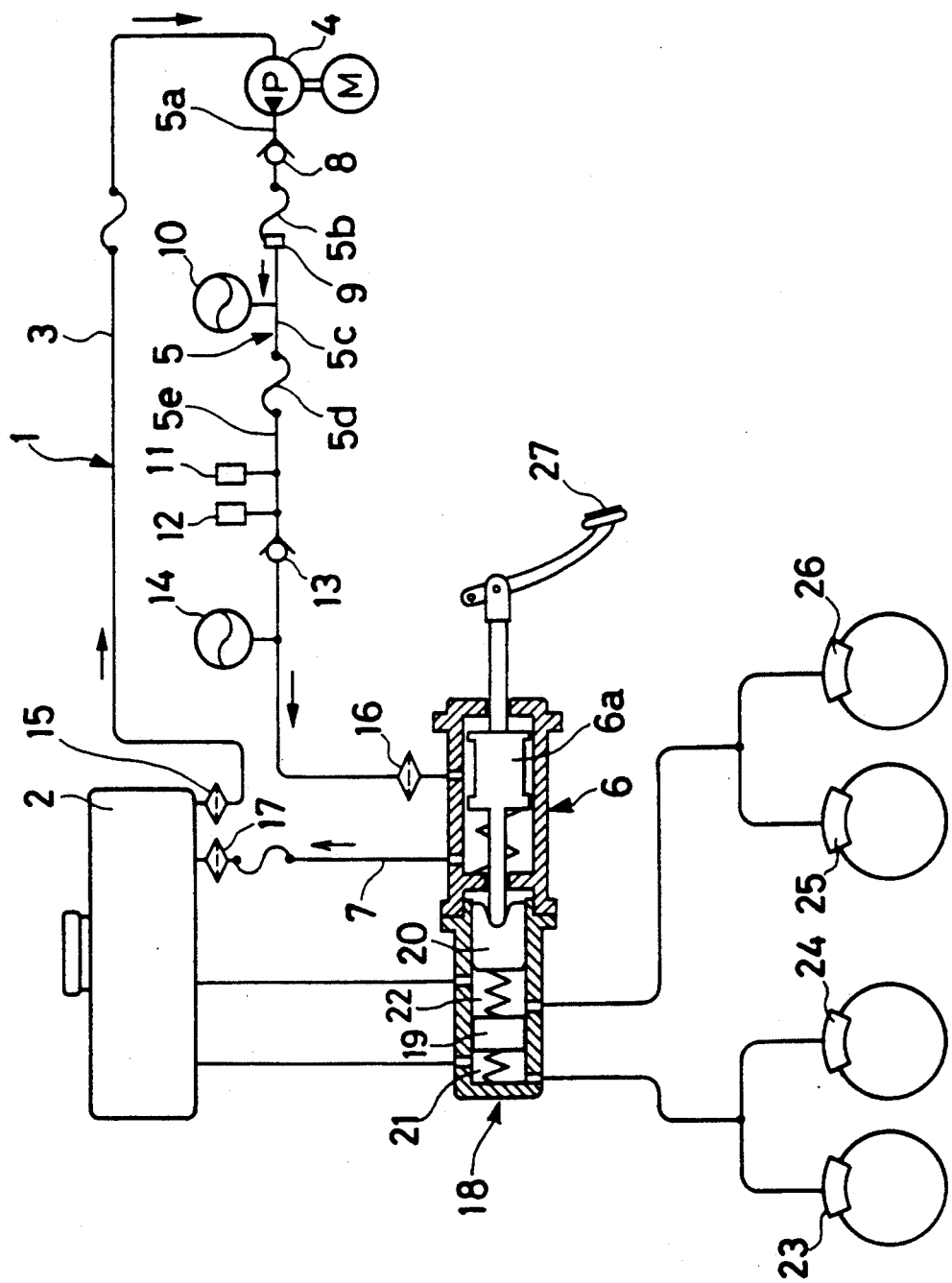
FIG. 1 is a drawing to show an embodiment of a hydraulic pressure booster system according to the present invention.

As shown in FIG. 1, the hydraulic pressure brake booster system 1 comprises a reserve tank 2 to store the operating fluid, a hydraulic pump 4 such as piston pump for pressurizing to the predetermined pressure by sucking the operating fluid in the reserve tank 2 through a suction passage 3 and also containing the hydraulic pressure generating means of this invention, a hydraulic brake booster equipment 6, to which the operating fluid pressurized by the hydraulic pump 4 is supplied through the feeding passage 5 and the input is boosted to the desired value by the operating fluid during the operation, and a discharge passage 7 for discharging the operating fluid in the hydraulic booster equipment 6 to the reserved tank 2.

The feeding passage 5 comprises a passage 5a on hydraulic pump side, a high pressure hose 5b made of flexible material such as rubber, an intermediate passage 5c, a high pressure hose 5d made of flexible material such as rubber, and a passage 5a on the side of hydraulic brake booster equipment 6.

On the passage 5a on hydraulic pump side, a check valve 8 is provided to allow only the operating fluid flowing from hydraulic pump 4 to hydraulic brake booster equipment 6. On the downstream end (opposite to the pump 4) of the flexible hose 5b, a restriction device 9 is furnished. As shown in FIG. 2, a hardware $5b_2$ is mounted at the end of the flexible portion $5b_1$ the high pressure hose 5b, and this hardware $5b_2$ consists of an external hardware $5b_2'$ furnished on outer periphery of the flexible portion $5b_1$ and an internal hardware $5b_2'$ furnished on inner periphery of the flexible portion $5b_1$. A hose connector $5b_3$ is connected to the external hardware $5b_2'$, and an orifice 9a is provided on this hose connector $5b_3$. The restriction device 9 comprises the internal hardware $5b_2''$, the restriction 9a, and the hose connector $5b_3$.

Further, an accumulator 10 is arranged on the intermediate passage 5c. This accumulator 10 absorbs the pulsation caused by the pump 4 and accumulates the operating fluid.

On the passage 5e on the hydraulic brake booster equipment side, there are provided from upstream side (pump side): a pressure switch 11 for on-off operation of the pump, a pressure switch 12 for issuing alarm for the hydraulic brake booster equipment 6, a check valve 13 for allowing only the flow of the operating fluid from the hydraulic pump 4 to hydraulic brake booster equipment 6, and an accumulator 14 to accumulate the hydraulic pressure as desired.

In addition, there are provided filters 15, 16 and 17 for removing foreign objects such as dust in the operating fluid on the suction passage 3, the passage 5e for hydraulic brake booster equipment side and the discharge passage 7.

On the other hand, a tandem type master cylinder 18 is connected to the hydraulic brake booster equipment 6, and two pressure chambers 21 and 22 are formed in the master cylinder 18 by a primary piston 19 and a secondary piston 20. These pressure chambers 21 and 22 are communicated with each of the brake cylinders 23, 24, 25 and 26 of front and rear wheels and are also with the reserve tank 2.

In the hydraulic brake booster system of the present embodiment with the arrangement as described above, the power piston 6a is operated by the pressurized operating fluid when the control valve (not shown) furnished in the power piston 6a of the hydraulic brake booster equipment 6 is switched over by treading the brake pedal 27 during braking operation. As the result, the power piston 6a is operated, and a pair of pistons 19 and 20 of the master cylinder 28 are operated, and hydraulic brake pressure is generated in a pair of pressure chambers 21 and 22. This hydraulic brake pressure is supplied to the brake cylinders 23-26 of each wheel, and braking operation is performed.

By the pressure switch for on-off operation of the pump, the on-off operation of the hydraulic pump 4 is controlled in such manner that a certain hydraulic pressure is maintained at all times in the accumulator 14.

Further, when trouble may occur such as the damage of the pipe in the passage 5a on hydraulic pump side, the pipe on the intermediate passage 5c and the high pressure hoses 5b and 5d or loosening of screws on hose connector, etc., hydraulic brake pressure leaks from the damaged portion or connection of these pipes or high pressure hoses, and hydraulic pressure is decreased. In this case, the operating fluid downstream of the check valve 13, i.e. the operating fluid present on the side of the hydraulic brake booster equipment 6 from the check valve 13 is prevented from flowing out upstream of the check valve 13. As the result, the hydraulic pressure downstream of the check valve 13 does not decrease, and this ensures perfect operation of the hydraulic brake booster equipment 6. Because a certain hydraulic pressure is accumulated in the accumulator 14 in this case, the hydraulic brake booster equipment 6 can be operated for the predetermined number of operations. Accordingly, the reliability of the hydraulic brake booster system 1 is increased.

Incidentally, the restriction device 9 is provided on the accumulator 10 of high pressure hose 5b. Thus, the pulsation caused by the pump 4 is reduced by the orifice 9a and also by elastic deformation of high pressure hose 5b. The pulsation decreased by restriction 9a and by elastic deformation of high pressure hose 5b is further absorbed by the accumulator 10. Therefore, the pulsation by the pump 4 is effectively reduced, and the pulsation is not transmitted toward the hydraulic brake booster equipment 6 almost at all.

The length of the high pressure hose 5d on the side of the hydraulic brake booster equipment 6 is designed as longer than the length of the high pressure hose 5b on the pump 4 side. That is, the length of the high pressure hose 5b is set relatively short, and the length of the high pressure hose 5d is set as long as possible within the restriction of the system layout.

In the hydraulic pressure booster system of the present embodiment with such arrangement, the pulsation generated by the pump 4 is absorbed by the elastic deformation of the high pressure hose 5b on the pump side as described above and is also absorbed by the restricting effect of the restriction device 9. In this case, the pulsation absorption by the high pressure hose 5b is small because the high pressure hose 5b on pump side is formed relatively short, while, the pulsation absorption by the restriction device 9 is big. Next, the pulsation is absorbed by the accumulator 10 for absorbing the pulsation and is finally absorbed by the high pressure hose 5d on the side of hydraulic brake booster equipment 6. In this case, the pulsation absorption by this high pressure hose 5d is big because the high pressure hose 5d on the side of the hydraulic brake booster equipment 6 is formed relatively long.

As described above, in the pulsation absorption by the relatively short high pressure hose 5d on the side of the pump 4, and by the restriction device 9 and by relatively long high pressure hose 5d on the side of hydraulic brake booster equipment 6, the same effect to absorb the pulsation can be obtained on two high pressure hoses as in the case where two high pressure hoses 5b and 5d are sufficiently long, and the pulsation can be more efficiently absorbed. As the result, the pulsation by the pump 4 can be effectively reduced, and the pulsation transmitted to the hydraulic brake booster equipment 6 is quite small.

Moreover, the entire system can be designed in more compact form because the high pressure hose 5b on the pump 4 side is formed relatively short.

The present invention is not limited to the above embodiment, and various design modifications can be conceived.

For example, in the above embodiment, the restriction 9a is provided on the end of the accumulator 10 of the high pressure hose 5b, whereas the restriction 9a can be provided in the middle of the high pressure hose 5b, or it may be provided on the pipe between the high pressure hose 5b and the accumulator 10.

Also, in the above embodiment, description has been given on the case where a flexible high pressure hose 5b is furnished on the supply passage 5, whereas the hose may not necessarily be a flexible high pressure hose.

The present invention can be applied, in addition to hydraulic brake booster systems, to other hydraulic pressure booster systems such as hydraulic clutch booster systems.

What we claim is:

1. A hydraulic pressure booster system comprising pump means for generating pressurized operating fluid, booster means for outputting a boosted force of brake pedal pressing force by said pressurized operating fluid, and a passage means for absorbing pulsations generated by said pump means in said pressurized operating fluid; said passage means including a passage interconnecting said pump means and said booster means, and an accumulator for continuously providing said pressurized operating fluid to said booster means arranged in said passage; said passage including a first flexible hose arranged between said accumulator and said pump means, a second flexible hose arranged between said accumulator and said booster means, said second flexible hose being longer than said first flexible hose, and a restriction provided on one end of said first flexible hose closer to said accumulator.

2. A hydraulic pressure booster system according to claim 1, wherein generating pressurized operating fluid, booster means for outputting a boosted force of brake pedal pressure force by said pressurized operating fluid, and a passage means for absorbing pulsations generated by said pump means in said pressurized operating fluid; said passage means including a passage interconnecting said pump means and said booster means, an accumulator for continuously providing said pressurized operating fluid to said booster means arranged in said passage, a flexible hose and a restriction arranged in said passage between said pump and said accumulator said restriction comprises an internal portion received in said first flexible hose, and external portion surrounding said first flexible hose, a hose connected to said external portion and a restricted opening provided in said hose connector.

3. A hydraulic pressure booster system comprising pump means for generating pressurized operating fluid, booster means for outputting a boosted force of brake pedal pressing force by said pressurized operating fluid, and a passage means for absorbing pulsations generated by said pump means in said pressurized operating fluid; said passage means including a passage interconnecting said pump means and said booster means, and an accumulator for continuously providing said pressurized operating fluid to said booster means arranged in said passage; said passage including a first flexible hose arranged between said accumulator and said pump means, a second flexible hose arranged between said accumulator and said booster means, said second flexible hose being longer than said first flexible hose, and a restriction provided on one end of said first flexible hose closer to said pump means.

4. A hydraulic pressure booster system according to claim 3, wherein said restriction comprises an internal portion received in said first flexible hose, and an external portion surrounding said first flexible hose, a hose connector connected to said external portion and a restrictive opening provided in said hose connector.

* * * * *